United States Patent
Pilon

(10) Patent No.: US 9,261,046 B2
(45) Date of Patent: Feb. 16, 2016

(54) GAS TURBINE EXHAUST NOISE REDUCTION

(71) Applicant: Lockheed Martin Corporation, Bethesda, MD (US)

(72) Inventor: Anthony Richard Pilon, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 705 days.

(21) Appl. No.: 13/746,006

(22) Filed: Jan. 21, 2013

(65) Prior Publication Data

US 2014/0284395 A1    Sep. 25, 2014

(51) Int. Cl.
*F02F 3/02* (2006.01)
*F02K 1/12* (2006.01)
*F02K 1/00* (2006.01)
*F02K 1/15* (2006.01)
*F02K 1/46* (2006.01)

(52) U.S. Cl.
CPC ........... *F02K 1/1207* (2013.01); *F02K 1/008* (2013.01); *F02K 1/15* (2013.01); *F02K 1/46* (2013.01)

(58) Field of Classification Search
CPC ........... F02K 1/008; F02K 1/15; F02K 1/46; F02K 1/1207
USPC ........................................ 60/262, 264, 226.1
See application file for complete search history.

(56) References Cited

U.S. PATENT DOCUMENTS

| 6,813,877 | B2 * | 11/2004 | Birch et al. ............... 60/226.1 |
| 7,475,550 | B2 | 1/2009 | Seiner |
| 7,721,549 | B2 * | 5/2010 | Baran ......................... 60/770 |

FOREIGN PATENT DOCUMENTS

GB          1466874          3/1977

OTHER PUBLICATIONS

C. Kannepalli et al., Evaluation of Some Recent Jet Noise Reduction Concepts, American Institute of Aeronautics and Astronautics, 2003, pp. 1-18, AIAA-2003-3313.
J. Mabe, Variable Area Jet Nozzle for Noise Reduction Using Shape Memory Alloy Actuators, Acoustics 08 Paris, 2008, pp. 5487-5492.

* cited by examiner

*Primary Examiner* — Ching Chang
(74) *Attorney, Agent, or Firm* — Reising Ethington P.C.

(57) ABSTRACT

A gas turbine jet noise reduction apparatus including a variable geometry gas turbine engine nozzle comprising a circumferentially distributed array of nozzle flap panels supported for alternate collective splaying and gathering motion, with the collective splaying motion of the flap panels being from a narrow position defining a minimum cross-sectional area at a nozzle exit plane, to a wide position defining a maximum cross-sectional area at the nozzle exit plane. A plurality of nozzle seal panels is supported in a circumferentially distributed array within the array of nozzle flap panels. A seal panel actuator is operatively engageable with the seal panels to deflect the seal panels radially inward into respective deployed positions to reduce jet noise by increasing exhaust stream mixing with ambient air.

20 Claims, 8 Drawing Sheets

GAS TURBINE EXHAUST NOISE REDUCTION

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This application relates generally to gas turbine exhaust noise reduction.

2. Description of Related Art Including Information Disclosed Under 37 CFR 1.97 AND 1.98

The optimum cross sectional exit plane area of a gas turbine engine's converging-diverging, (supersonic) exhaust nozzle is a function of the nozzle throat area, exhaust gas speed, stagnation pressure, thermodynamic conditions, and other factors. Differences in pressure between the exhaust stream and ambient airflow can reduce the engine's efficiency, and increase radiated noise. For this reason, the gas turbine engines powering many high performance tactical aircraft are fitted with variable geometry exhaust nozzles that can expand or contract to provide an exit plane area optimized for efficient thrust delivery at most throttle settings, pressure altitudes, etc.

Although a properly contoured supersonic exhaust nozzle, e.g. a "de Laval" nozzle, may provide the most efficient generation of thrust for one set of operating conditions (exhaust speed, temperature, pressure, flight altitude, etc.), the wide range of tactical operating conditions requires the use of variable geometry exhaust nozzles. A de Laval nozzle operating at its design condition will perfectly expand the supersonic exhaust stream, i.e. there will be no shock waves in the exhaust plume, and therefore no "shock associated noise" or "screech". Variable geometry nozzles, by the nature of their frustoconical convergent and divergent sections, operate off-condition, so that the exhaust plume is imperfectly expanded. At military power (non-afterburning) takeoff conditions for most tactical aircraft, the exhaust nozzles operate in an over-expanded condition, meaning that the pressure in the exhaust stream is below that of the ambient air stream. The shock waves generated by this imperfect expansion contribute to the supersonic jet noise generated by tactical aircraft exhaust flows. However, the dominant source of noise from tactical aircraft is the supersonic convection of large turbulent structures in the nozzle exhaust plume. One proven means of reducing the strength of this noise source is to increase the mixing between the high-energy jet exhaust and the low-energy ambient air. Doing so reduces the amount of energy available for noise generation in the exhaust plume, and also increases the frequency of the radiated sound. This is beneficial because the atmosphere attenuates higher frequencies much more rapidly. Mixing apparatuses, such as chevrons or tabs, may be added to the nozzle to increase mixing, but these devices reduce the engine thrust, increase complexity, and add weight penalties.

SUMMARY

A gas turbine jet noise reduction apparatus is provided for reducing noise generated by a gas turbine engine supersonic exhaust plume. The apparatus includes a variable geometry gas turbine engine nozzle comprising a circumferentially distributed array of nozzle flap panels supported for alternate collective splaying and gathering motion, the collective splaying motion of the flap panels being from a narrow position defining a minimum cross-sectional area at a nozzle exit plane, to a wide position defining a maximum cross-sectional area at the nozzle exit plane. The apparatus also includes a plurality of nozzle seal panels supported in a circumferentially distributed array within the array of nozzle flap panels, and a seal panel actuator that operatively engages one or more seal panels of the array of nozzle seal panels. The seal panel actuator is configured to deflect the engaged seal panels radially inward toward a fully deployed position to reduce jet noise by increasing exhaust stream mixing with ambient air.

Also provided is a method for reducing jet noise generated by an exhaust plume emanating from a variable geometry nozzle of a gas turbine engine, where the variable geometry nozzle comprises a plurality of nozzle seal panels supported in a circumferentially distributed array in respective sealing positions adjacent a plurality of nozzle flap panels supported for alternate collective splaying and gathering motion between a narrow position defining a minimum nozzle exit plane cross-sectional area and a wide position defining a maximum nozzle exit plane cross-sectional area. The method includes increasing exhaust stream mixing with ambient air by deflecting at least one seal panel of the plurality of nozzle seal panels radially inward toward a fully deployed position.

Also provided is a method for vectoring thrust developed by a gas turbine engine where the engine includes a variable geometry nozzle comprising a plurality of nozzle seal panels supported in a circumferentially distributed array in respective sealing positions adjacent a plurality of nozzle flap panels supported for alternate collective splaying and gathering motion between a narrow position defining a minimum nozzle exit plane cross-sectional area and a wide position defining a maximum nozzle exit plane cross-sectional area. The method includes directing off-axis the exhaust plume emanating from the nozzle by deflecting selected seal panels of the plurality of seal panels radially inward from respective stowed positions toward respective fully deployed positions.

DRAWINGS DESCRIPTIONS

These and other features and advantages will become apparent to those skilled in the art in connection with the following detailed description and drawings of one or more embodiments of the invention, in which.

Figure 1:
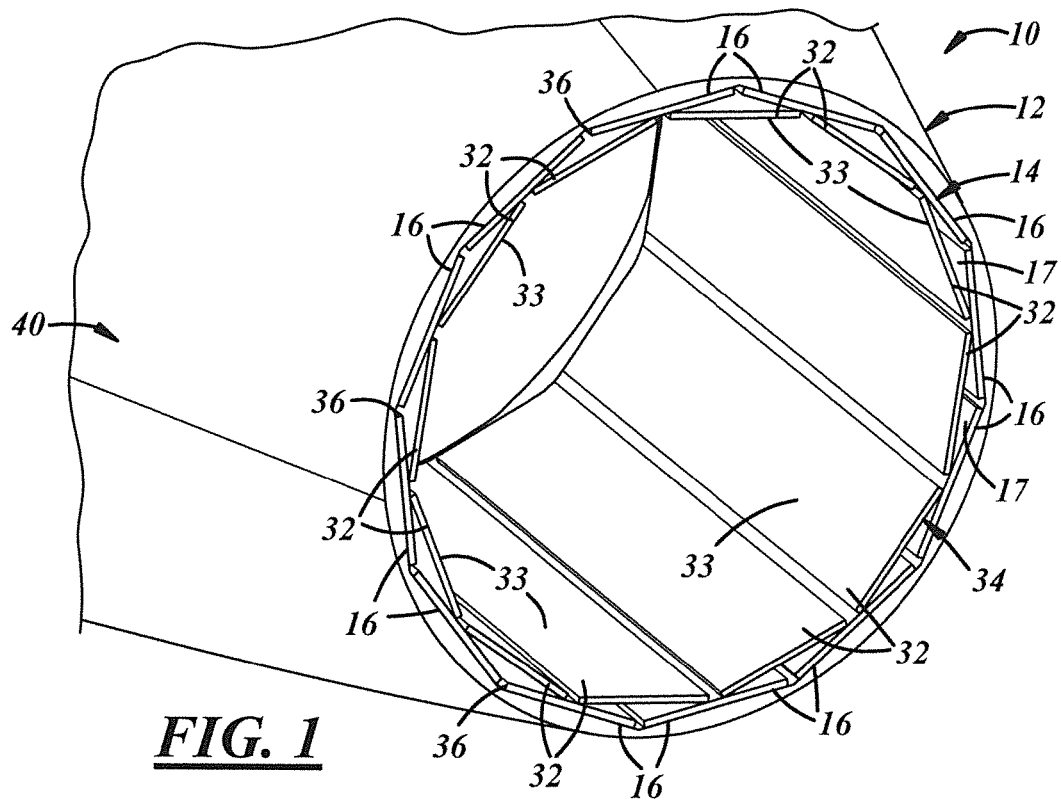
FIG. 1 is a schematic perspective view of an illustrative embodiment of an jet noise reduction apparatus installed in a diverging section of a variable geometry gas turbine exhaust nozzle with actuable divergent seal panels of the apparatus shown in respective stowed positions against divergent flap panels of the gas turbine exhaust nozzle.
Figure 2:
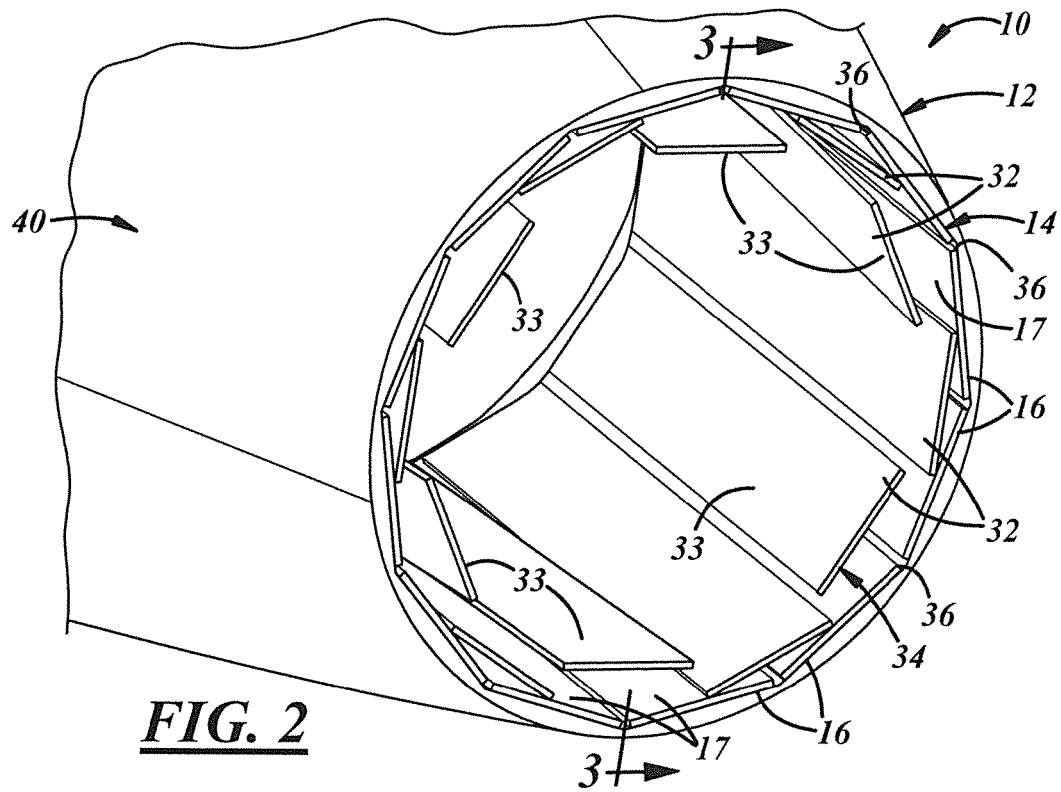
FIG. 2 is a schematic perspective view of the jet noise reduction apparatus and gas turbine exhaust nozzle of FIG. 1 with the actuable divergent seal panels of the apparatus shown in respective fully deployed positions.
Figure 3:
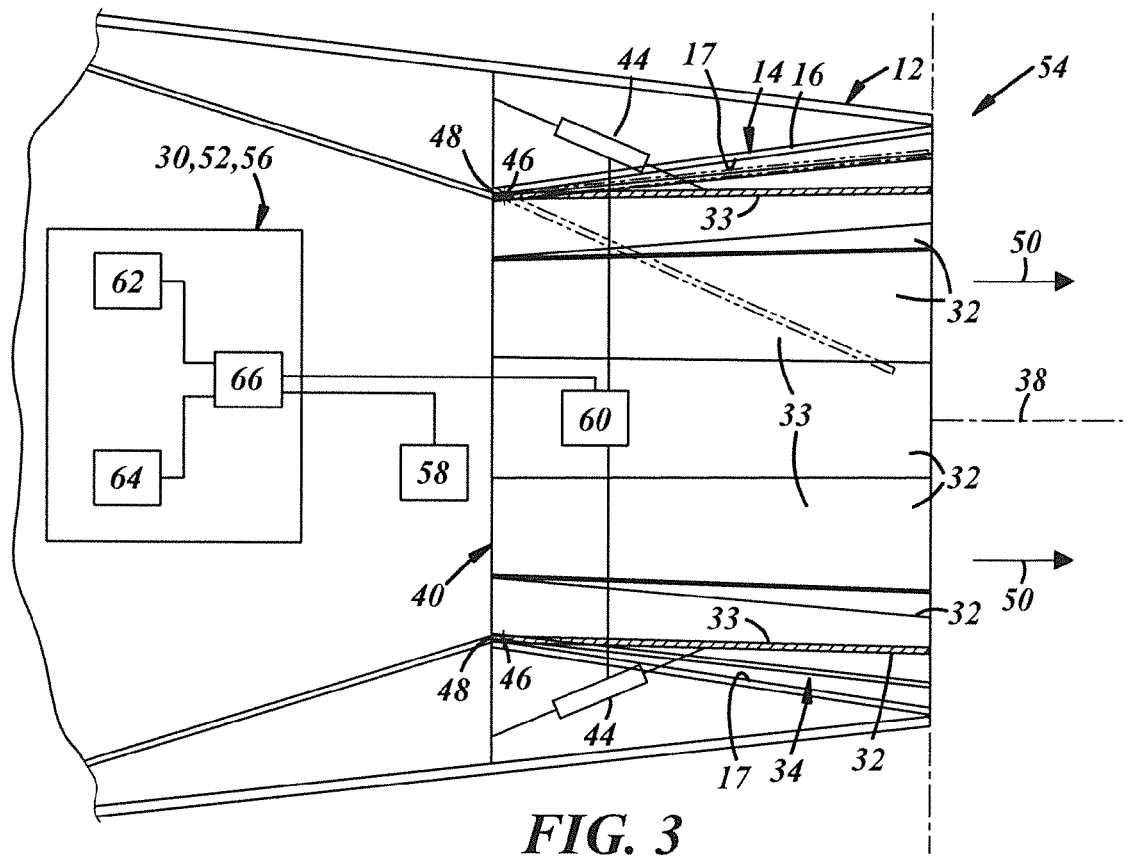
Figure 4:
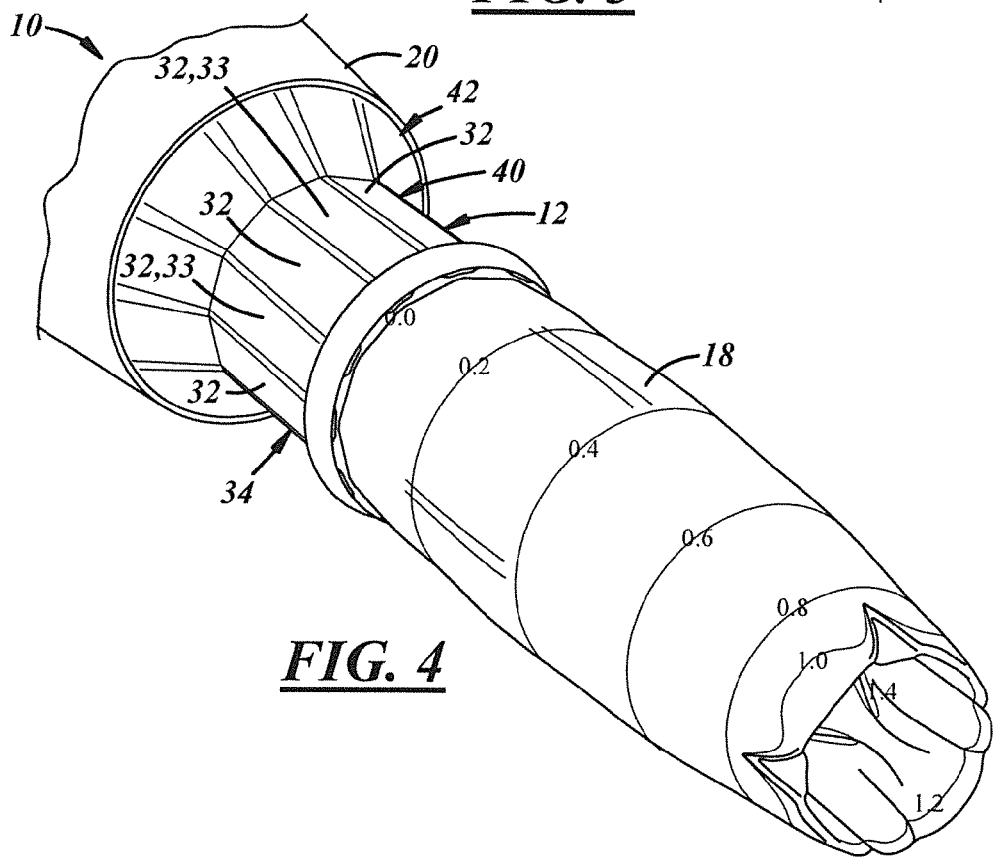
Figure 5:
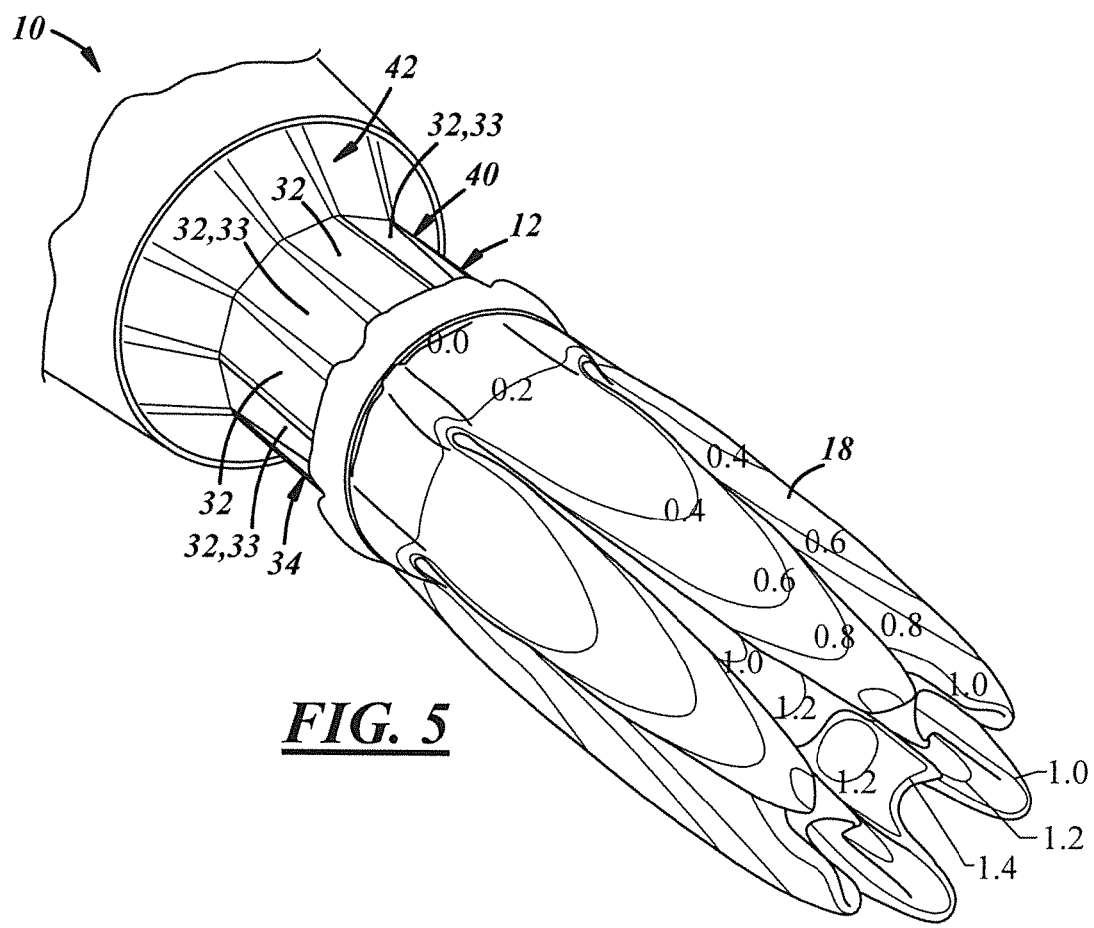
Figure 6:
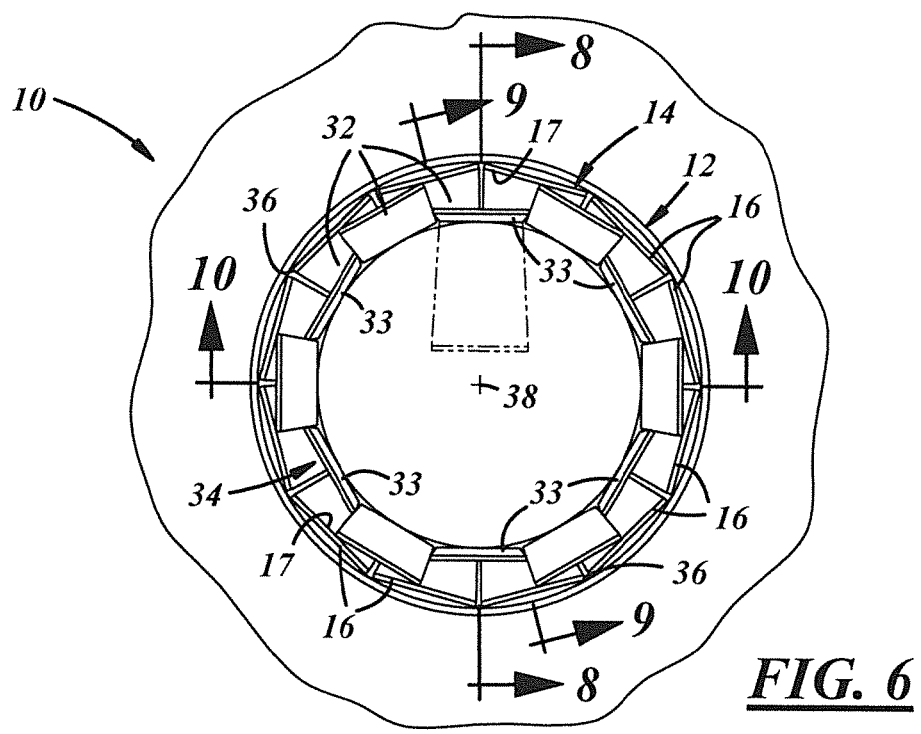
Figure 7:
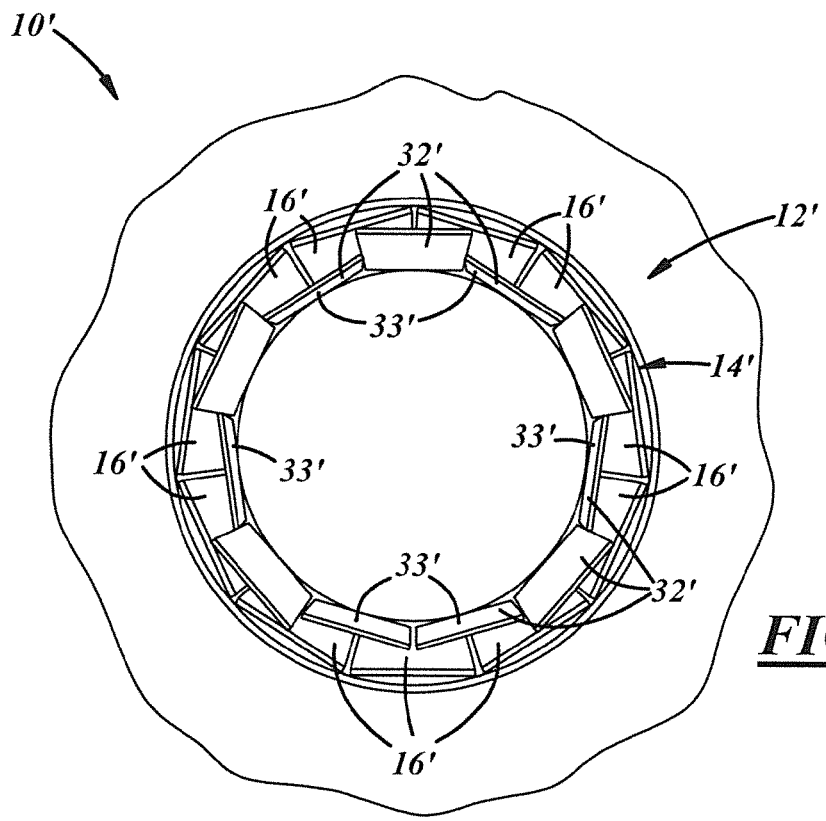
Figure 8:
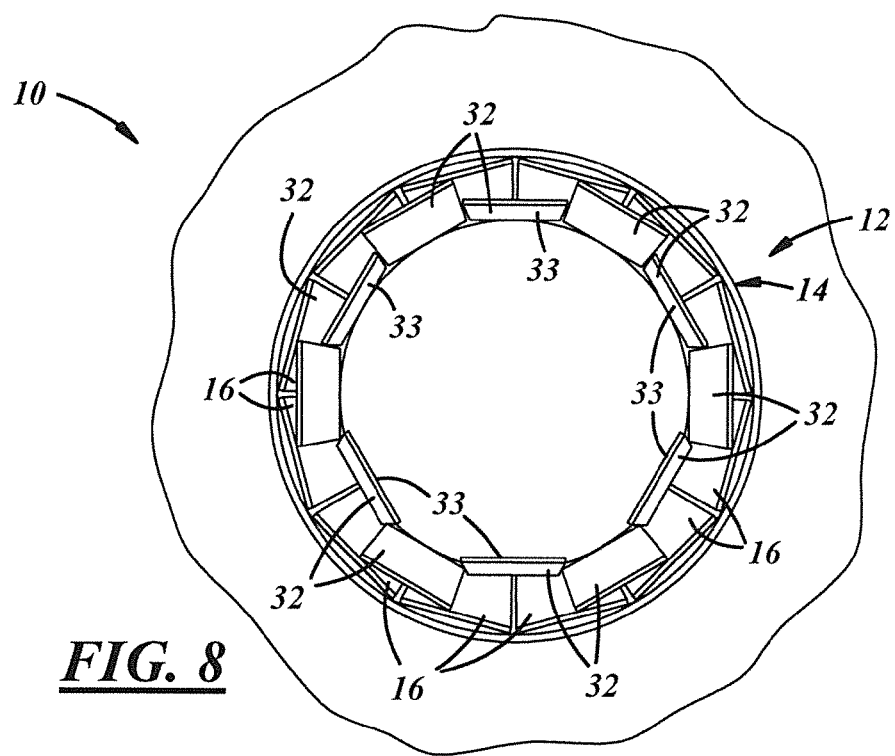
Figure 9:
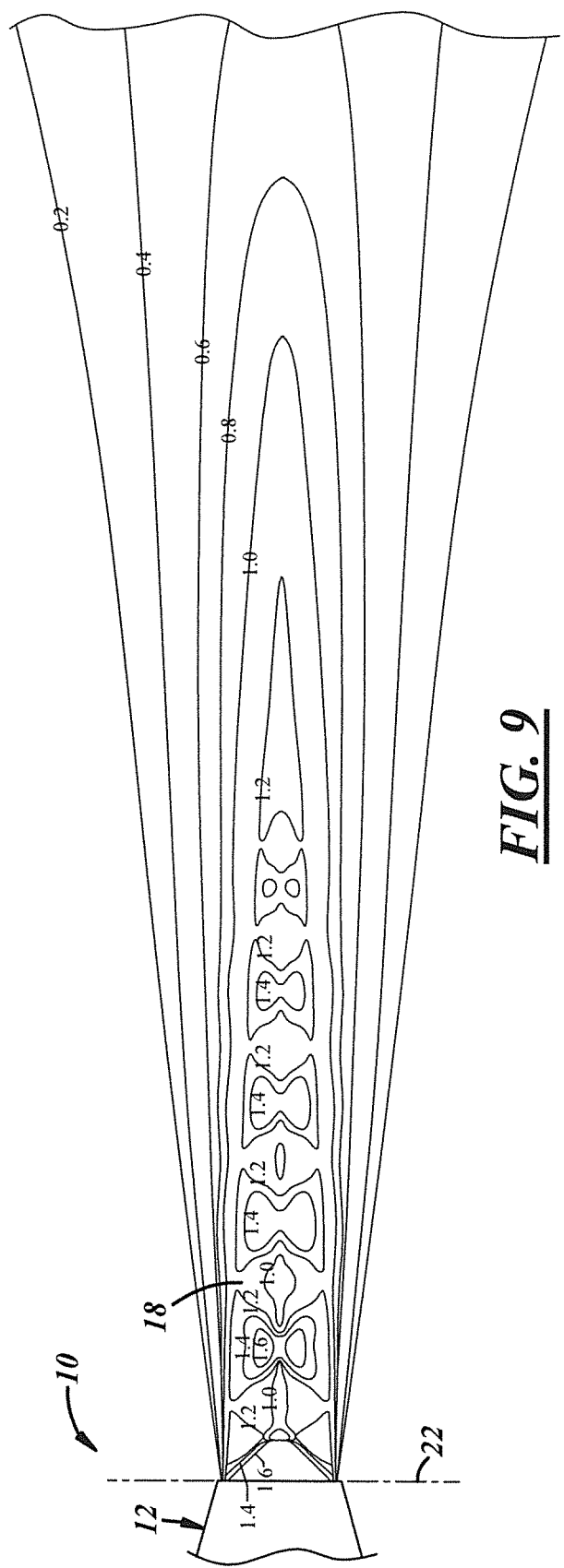
Figure 10:
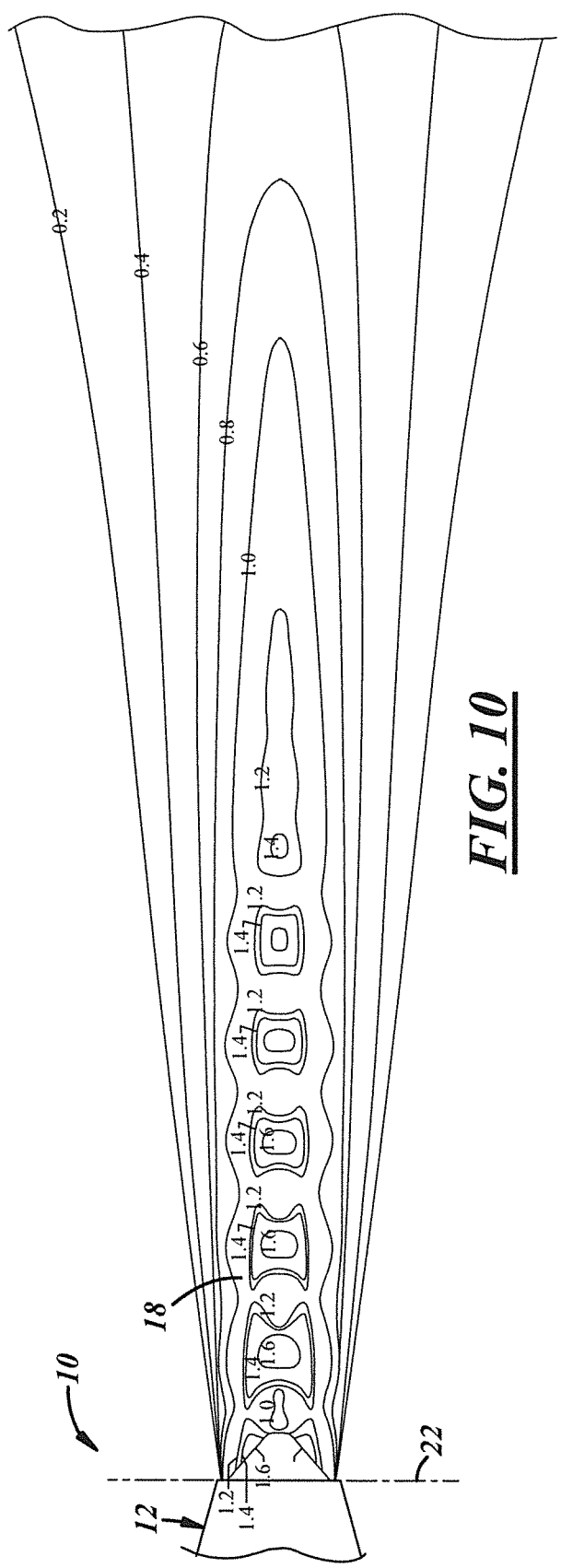
Figure 11:
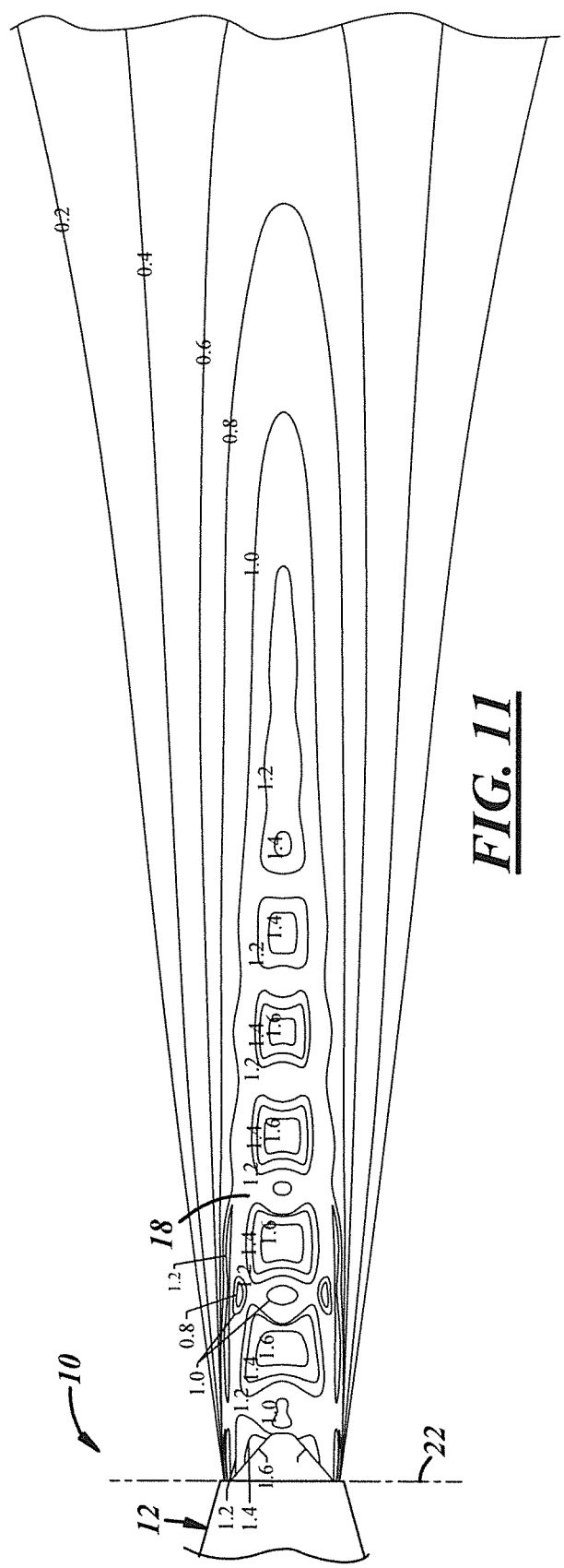
Figure 12:
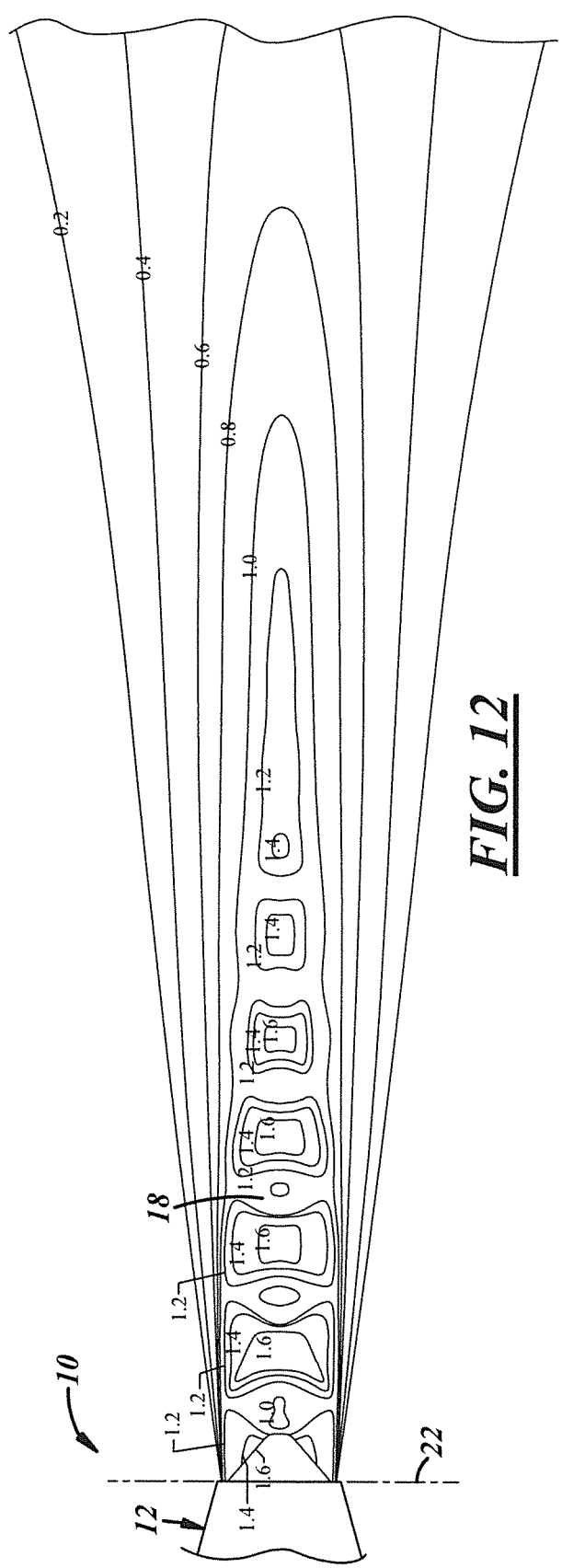

FIG. 3 is a schematic cross-section view of the apparatus of FIG. 2 taken along line 3-3 of FIG. 2 with the actuable divergent seal panels in respective fully-deployed positions approximately 5 degrees from their respective stowed positions, showing one actuable divergent seal panel in phantom in an optional fully deployed position 30 degrees from its stowed position, and showing schematic representations of engine controller, actuator, and sensor components of a jet engine comprising the gas turbine exhaust nozzle;

FIG. 4 is a schematic perspective view of an iso-vorticity surface of an exhaust plume emanating from the apparatus and nozzle of FIGS. 1 and 2 with constant mach number lines shown superimposed on the plume iso-vorticity surface, the apparatus and nozzle being shown with a cowl of the nozzle removed to reveal the actuable divergent seal panels of the apparatus in respective stowed positions;

FIG. 5 is a schematic perspective view of an iso-vorticity surface of the exhaust plume emanating from the apparatus and nozzle of FIGS. 1 and 2 with constant mach number lines shown superimposed on the plume iso-vorticity surface; the apparatus and nozzle being shown with the cowl removed to reveal the actuable seal panels of the apparatus in respective fully deployed positions;

FIG. 6 is a schematic end view, looking upstream, of the apparatus and nozzle of FIGS. 1 and 2 showing the actuable divergent seal panels in respective fully deployed positions;

FIG. 7 is a schematic end view, looking upstream, of an alternate embodiment of the apparatus and nozzle of FIGS. 1 and 2 showing a nozzle seal panel array comprising an odd number of seal panels, and showing actuable divergent seal panels of the array in respective positions between fully and partially-deployed to maintain thrust on-axis;

FIG. 8 is a schematic end view, looking upstream, of the apparatus and nozzle of FIGS. 1 and 2 showing actuable divergent seal panels of the seal panel array in respective deployed positions for providing off-axis thrust;

FIG. 9 is a schematic cross-sectional side view of an exhaust plume emanating from the exhaust nozzle of FIGS. 1 and 2 for a representative takeoff power condition with the actuable seal panels retracted, and showing constant mach number lines in the plume;

FIG. 10 is a schematic cross-sectional side view of an exhaust plume emanating from the exhaust nozzle of FIGS. 1 and 2 for a representative takeoff power condition with the actuable divergent seal panels fully deployed, taken along line 8-8 of FIG. 6, and showing constant mach number lines in the plume;

FIG. 11 is a schematic cross-sectional side view of an exhaust plume emanating from the exhaust nozzle of FIGS. 1 and 2 for a representative takeoff power condition with the actuable divergent seal panels fully deployed, taken along line 9-9 of FIG. 6, and showing constant mach number lines in the plume; and FIG. 12 is a schematic cross-sectional side view of an exhaust plume emanating from the exhaust nozzle of FIGS. 1 and 2 for a representative takeoff power condition with the actuable divergent seal panels fully deployed, taken along line 10-10 of FIG. 6, and showing constant Mach number lines in the plume.

DETAILED DESCRIPTION

A first embodiment of an apparatus that reduces jet noise generated by a gas turbine engine exhaust plume is generally shown at 10 in FIGS. 1-6 and 8-12. An alternate embodiment is shown at 10' in FIG. 7. Reference numerals with the designation prime (') in FIG. 7 indicate alternative configurations of similarly-numbered elements that also appear in the first embodiment. Unless indicated otherwise, where a portion of the following description uses a reference numeral to refer to FIGS. 1-6 and 8-12, that portion of the description applies equally to similarly-numbered elements designated by primed numerals in FIG. 7.

With reference to FIGS. 1 and 2, the apparatus 10 may include a variable geometry gas turbine engine nozzle 12 comprising a generally frustoconical circumferentially distributed array 14 of nozzle flap panels 16 supported for alternate collective splaying and gathering motion about an exhaust plume 18 (FIG. 4) of an engine 20. The collective splaying motion of the flap panels 16 may comprise moving the panels 16 from a contracted position defining a minimum cross-sectional area at a nozzle exit plane 22, to an expanded position defining a maximum cross-sectional area at the nozzle exit plane 22. In other words, the collective gathering motion of the flap panels 16 may be the reverse of the collective splaying motion; from maximum to minimum cross-sectional area at the nozzle exit plane 22.

A variable geometry nozzle actuator system (not shown) may drive the nozzle flap panel array 14 between the contracted and expanded positions according to a predetermined schedule in response to a number of factors that may include, for example: throttle position, engine rotational speed, and gas temperatures and pressures at various engine exhaust, compressor, and/or turbine stages. The actuator system may include a ring (not shown) that drivingly engages the flap panels 16 and that is driven by a plurality of actuators (also not shown). The actuators may be actuated by a controller 30 (shown in FIG. 3) that may be an engine controller 30 such as a Full Authority Digital Engine Controller (FADEC). The controller 30 may be programmed to actuate the flap panels 16 in accordance with a desired schedule and in response to one or more desired inputs. The nozzle flap panel array 14 may generally reside in the contracted position when the engine 20 is being operated at military power (i.e., full power without engaging afterburner) and in the expanded position when the engine 20 is being operated at maximum power (with full afterburner).

As shown in FIGS. 1, 2, 3, 4, and 6, a plurality of seal panels 32 may be supported by the flap panels 16 in a circumferentially distributed and generally frustoconical seal panel array 34 carried by the flap panels 16. The seal panels 32 may be supported in respective sealing positions for sliding motion flat against radially inner surfaces 17 of the flap panels 16. As best shown in FIGS. 1 and 2, the seals 32 may also be supported to overlap the flap panels 16 so as to span gaps or seams 36 between circumferentially adjacent and/or overlapping flap panels 16 of the flap panel array 14 to seal the nozzle flap panel array 14 against leakage of jet exhaust gases through the gaps or seams 36 between adjacent and/or overlapping flap panels 16. As best shown in FIGS. 3 and 6, the seal panels 32 may thus circumscribe a centerline 38 of the engine 20 and define a radial outer boundary of a core exhaust stream flow path through a divergent section 40 of the nozzle 12.

In other words, the nozzle 12 may be a convergent/divergent nozzle comprising convergent 42 and divergent 40 nozzle sections as shown in FIGS. 4 and 5, and the circumferentially distributed array 14 of nozzle flap panels 16 may be concentrically disposed within the divergent section 40 of the nozzle 12. The nozzle 12 may thus comprise the array 14 of divergent flap panels 16, which may be connected to the convergent section 42 of the nozzle 12. The seal panel array 34 may be divergent and carried by and concentrically disposed within the divergent section 40 of the nozzle 12 and disposed within the circumferentially distributed array 14 of divergent nozzle flap panels 16.

As best shown in FIG. 3, the apparatus 10 may also include a seal panel actuator 44 carried by the nozzle 12, which may be operatively engaged with, and which may be connected to certain ones of the circumferentially distributed seal panels 32 selected, configured, and supported for such engagement and deployment and hereinafter referred to as "engaged" seal panels 33. The seal panel actuator 44 may be configured to deflect the engaged seal panels 33 radially inward from the flap panels 16 toward respective fully deployed positions. The engaged seal panels 33 may be deployed in this fashion to reduce jet noise by increasing exhaust stream mixing with ambient air when deflected inward toward the fully deployed position.

As best shown in FIG. 3, the engaged seal panels 33 may be supported for approximately five degrees of pivotal motion about respective pivot axes 46 that may be disposed at or adjacent respective leading edges 48 of the engaged seal panels 33 and oriented transverse to an exhaust stream flow direction 50. The seal panel actuator 44 may be configured to pivot the engaged seal panels 33 between respective stowed positions against respective radially adjacent flap panels 16 and respective fully deployed positions angled away from the respective adjacent flap panels 16. In the present embodiment, in their respective fully deployed positions the engaged seal panels 33 may be angled 5 degrees from respective adjacent flap panels 16, but in other embodiments, and as shown by the seal panel shown in phantom in FIG. 3, in their fully deployed positions the engaged seal panels 33 may be angled up to 30 degrees from respective adjacent flap panels 16. Preferably, however, the seal panels 33 are pivotable to respective fully deployed positions that are less than 15 degrees from respective adjacent flap panels 16.

The seal panel actuator 44 may be connected to any of one or more of the seal panels 32 in a seal panel array 34. Where the array 34 includes an even number of seal panels 32 the seal panel actuator 44 may be operatively engaged with and connected to every other one of the seal panels 32 of the seal panel array 34. As shown in FIG. 2, the seal panel actuator 44 may thus be configured to deflect every other one of the seal panels 32, i.e., the engaged seal panels 33, radially inward away from respective radially adjacent flap panels 16 to optimize mixing without adversely affecting nozzle operation and thrust generation.

Where a seal panel array 34 includes an even number of seal panels 32 it may be advantageous for the seal panel actuator 44 to be operatively engaged with, and connected to, seal panels 32 that are diametrically opposed. As shown in FIG. 3, the seal panel actuator 44 may be configured to deflect the diametrically opposed "engaged" seal panels 33 radially inward toward one another from respective radially adjacent flap panels 16 to preclude the introduction of an off-axis force vector and a resulting pitching and/or yawing moment.

As shown in FIG. 3, the apparatus 10 may comprise a seal panel controller 52 in communication with the seal panel actuator 44 and configured to actuate the engaged seal panels 33 between their respective stowed and fully deployed positions in accordance with a desired schedule and in response to desired inputs. According to a preferred embodiment, the seal panel controller 52 may be an engine controller in communication with the seal panel actuator 44 and configured to actuate the engaged seal panels 33 between their respective stowed and fully deployed positions. The engine controller may, for example, be the same FADEC that is connected to and programmed to actuate the flap panels 16.

The seal panel controller 52 may be configured to maintain engine thrust on-axis by commanding the seal panel actuator 44 to deflect one or more of the engaged seal panels 33 to their respective fully deployed positions, and/or to respective positions between their stowed and fully deployed positions. This allows engine thrust to be maintained on axis whether the seal panel array includes an odd number of seal panels 32' as shown in FIG. 7, or an even number of seal panels 32 as shown in the other Figures, and enables the controller 52 to compensate for any damaged and/or unresponsive seal panels 32.

As shown in FIG. 8, the controller 52 may also be configured to vector thrust, i.e., to direct engine thrust off-axis, by commanding the seal panel actuator 44 to selectively deploy the engaged seal panels 33 to respective varying positions between and/or including stowed and fully deployed. This allows the engaged seal panels 33 to assist in directing the aircraft. For example, off-axis engine thrust may be used to assist in takeoff rotation.

In practice, gas turbine engine jet noise may be reduced by increasing exhaust stream mixing with ambient air, which may be accomplished by deflecting variable geometry nozzle seal panels 32 of a circumferentially-distributed seal panel array 34 radially inward toward respective fully-deployed positions. Where, as shown in FIGS. 1-6 and 9-12, a seal panel array 34 includes an even number of seal panels 32, every other one of the seal panels 32 may be deflected by an equal amount to maintain thrust on-axis. Where, as shown in FIG. 7, a seal panel array 34' includes an odd number of seal panels 32' an exhaust stream may be mixed with ambient air by deflecting selected seal panels 32' of the odd-numbered seal panel array 34' to respective positions between stowed and fully deployed such that thrust is maintained on-axis.

The exhaust plume emanating from the nozzle 12 may, alternatively, be directed off-axis to provide vectored thrust. As shown in FIG. 8, this may be done by deflecting selected seal panels 32 of the plurality of seal panels radially inward from respective stowed positions to respective fully deployed positions, and/or to respective positions between stowed and fully deployed positions.

As shown in FIG. 3, the apparatus 10 may comprise a computer-controlled system 54 comprising a computer apparatus 56. The computer apparatus 56 may comprise at least one input device 58 configured to receive data, at least one output device 60 configured to output data in the form of control signals, a memory device 62 configured to store program instructions and data, and a processor 64 coupled to the input, output, and memory devices 58, 60, 62, and configured to cause the computer-controlled system 54 to execute method steps according to the claims, such as increasing exhaust stream mixing with ambient air by causing the seal panel actuator 44 to deflect one or more seal panels 32 radially inward into a fully deployed position, or retracting one or more seal panels 32 into stowed positions.

The computer apparatus 56 may also comprise one or more interfaces 66. The interfaces 66 may include internal and/or external communication interfaces and may include wired and/or wireless devices. For example, the interfaces 66 may include an internal bus, which may provide for data communication between the processor, memory, and/or other interface elements of the computing apparatus 56. In another example, the interfaces 66 may include an external bus for data communication between elements of the computing apparatus 56 and peripheral devices. The interfaces 66 may include one or more of any of several types of bus structures, including a memory bus or memory controller, a peripheral bus, an accelerated graphics port, a local or processor bus, and using any of a variety of bus architectures. Also, the interfaces 66 may include analog-to-digital or digital-to-analog converters, signal conditioners, amplifiers, filters, other electronic devices or software modules, and/or any other suitable interfaces. The interfaces 66 may conform to, for example, RS-232, parallel, small computer system interface, universal serial bus, and/or any other suitable protocol(s). The interfaces 66 may include circuits, software, firmware, and/or any other device to assist or enable the computing apparatus 56 in communicating internally and/or externally with other devices.

In general, one or more of the computer apparatuses 56 may be used to carry out various aspects of the presently disclosed method. In one example, the computing apparatus 56 may receive input data and instructions from input devices 58, for example, sensors (reporting information such as throttle position, engine rotational speed, and gas temperatures and pressures at various exhaust, compressor, and turbine stages of the engine), process the received input in light of stored software and/or data, and transmit output signals to output devices 60, for example, the seal panel actuator 44 or the like. The computing apparatus 56 may include, for example, an electrical circuit, an electronic circuit or chip, and/or an engine controller 30, for example, the Full Authority Digital engine Controller (FADEC).

The computing apparatus 56 further may include any ancillary devices, for example, clocks, internal power supplies, and the like (not shown). Although not shown, the computing apparatus 56 may be supplied with electricity by an external power supply, for example, an engine-driven generator, an AC to DC transformer, one or more batteries, fuel cells, or the like.

The input devices 58 and output devices 60 may be separate or integrated, and may be used to receive or transmit any suitable input or output. The input devices 58 may include apparatus input devices such as panel position sensors, and existing FADEC input sensors or user input devices, for example, a throttle. The input devices 58 may be used to enter any suitable commands, instructions, data, information, signals, or the like into the processor 64. The output devices 60 may include user output devices, for example, a monitor or any other type of display device, and may include electromechanical output devices, such as the seal panel actuator 44.

The processor 64 may process data and execute instructions that provide at least some of the functionality for the various portions of the computer apparatus 56. As used herein, the term instructions may include, for example, control logic, computer software and/or firmware, programmable instructions, or other suitable instructions. The processor 64 may include, for example, one or more microprocessors, microcontrollers, discreet logic circuits having logic gates for implementing logic functions on data signals, application specific integrated circuits with suitable logic gates, programmable or complex programmable logic devices, programmable or field programmable gate arrays, and/or any other suitable type of electronic processing device(s).

The memory device 62 may include any computer readable storage medium or media configured to provide at least temporary storage of at least some data, data structures, an operating system, application programs, program modules or data, and/or other computer software or computer-readable instructions that provide at least some of the functionality of the computer apparatus 56 and that may be executed by the processor 64. The data, instructions, and the like may be stored, for example, as look-up tables, formulas, algorithms, maps, models, and/or any other suitable format.

The memory device 62 may be in the form of removable and/or non-removable, volatile memory and/or non-volatile memory. Illustrative volatile memory may include, for example, random access memory (RAM), static RAM (SRAM), dynamic RAM (DRAM) including synchronous or asynchronous DRAM, and/or the like, for running software and data on the processor. By way of example, and not limitation, the volatile memory may include an operating system, application programs, other memory modules, and data. Illustrative non-volatile memory may include, for example, read only memory (ROM), erasable programmable ROM (EPROM), electrically erasable programmable ROM (EEPROM), dynamic read/write memory like magnetic or optical disks or tapes, and static read/write memory like flash memory, for storing software and data. Although not separately shown, the computer 56 may also include other removable/non-removable volatile/non-volatile data storage or media. For example, the other media may include dynamic or static external storage read/write devices.

The computer apparatus 56 may include a computer program product stored on a computer-readable storage medium such as the memory device 62 and including instructions executable by one or more computer processors of an engine controller 30, such as a FADEC, to cause the engine controller 30 to implement steps of a method for reducing gas turbine engine jet noise as disclosed above. The computer program product may include one or more software programs comprised of program instructions in source code, object code, executable code or other formats, one or more firmware programs, or hardware description language (HDL) files, and any program related data. The data may include data structures, look-up tables, or data in any other suitable format. The program instructions may include program modules, routines, programs, objects, components, and/or the like. The computer program product can be executed on one computer or on multiple computers in communication with one another.

The program(s) can be embodied on non-transitory computer readable media, which can include one or more storage devices, articles of manufacture, or the like, such as the memory device 62. Example non-transitory computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The non-transitory computer readable storage medium may also include computer to computer connections, for example, via a network or another communications connection (either wired, wireless, or a combination thereof). Non-transitory computer readable media include all computer readable media, with the sole exception of transitory propagating signals. Any combination(s) of the above examples is also included within the scope of the computer-readable media. It is therefore to be understood that the method can be at least partially performed by any electronic articles and/or devices capable of executing instructions corresponding to one or more steps of the disclosed method.

A jet noise reduction apparatus and method constructed and executed as described above allows for seal panel deployment and consequent jet noise reduction during phases of flight, such as takeoff, where an aircraft is most likely to be operating in a noise-sensitive environment. However, the apparatus and method also allow for seal panel retraction during phases of flight where maximum engine performance is critical. The apparatus is capable of being computer-controlled, allowing all its functions to be accomplished automatically without increasing aircrew workload.

This description, rather than describing limitations of an invention, only illustrates an embodiment of the invention recited in the claims. The language of this description is therefore exclusively descriptive and is non-limiting. Obviously, it is possible to modify this invention from what the description teaches. Within the scope of the claims, one may practice the invention other than as described above.

What is claimed is:

1. An apparatus for reducing jet noise generated by a gas turbine engine exhaust plume, the apparatus comprising:
   a variable geometry gas turbine engine nozzle comprising
      a circumferentially distributed array of nozzle flap panels supported for alternate collective splaying and gathering motions, the collective splaying motion of the nozzle flap panels being from a narrow position defining a minimum cross-sectional area at a nozzle exit plane, to a wide position defining a maximum cross-sectional area at the nozzle exit plane;

a plurality of nozzle seal panels supported in a circumferentially distributed array within the array of nozzle flap panels; and a seal panel actuator operatively engageable with at least one nozzle seal panel of the array of nozzle seal panels and configured to deflect the at least one nozzle seal panel radially inward toward a fully deployed position to reduce jet noise by increasing exhaust stream mixing with ambient air.

2. An apparatus as defined in claim 1 in which:

the nozzle is a convergent/divergent nozzle comprising convergent and divergent nozzle sections;

the circumferentially distributed array of nozzle flap panels comprises an array of divergent flap panels;

the nozzle seal panel array is a divergent seal panel array carried by and concentrically disposed within the divergent section of the nozzle and disposed within the circumferentially distributed array of divergent nozzle flap panels.

3. An apparatus as defined in claim 2 in which:

the nozzle seal panel array includes an even number of seal panels; and the seal panel actuator is operatively engaged with every other one of the seal panels of the nozzle seal panel array and is configured to deflect the engaged seal panels radially inward away from respective radially adjacent flap panels of the nozzle flap panel array.

4. An apparatus as defined in claim 1 in which:

nozzle seal panels engaged by the seal panel actuator are supported for pivotal motion about respective pivot axes disposed at or adjacent respective leading edges of the engaged nozzle seal panels and oriented transverse to an exhaust stream flow direction; and the seal panel actuator is configured to pivot the engaged nozzle seal panels between respective stowed positions against respective adjacent flap panels and respective fully deployed positions angled away from the respective adjacent flap panels.

5. An apparatus as defined in claim 4 in which angular displacement between the respective stowed and fully deployed positions is less than or equal to 30 degrees.

6. An apparatus as defined in claim 4, further comprising a controller in communication with the seal panel actuator, the controller being configured to command the seal panel actuator to deflect the engaged seal panels to respective positions between their respective stowed and fully deployed positions in accordance with a schedule and in response to inputs.

7. An apparatus as defined in claim 6 in which the controller is an engine controller.

8. An apparatus as defined in claim 6 in which the controller is configured to maintain engine thrust on-axis by commanding the seal panel actuator to deflect one or more of the engaged nozzle seal panels to their respective fully deployed positions.

9. An apparatus as defined in claim 6 in which the controller is configured to maintain engine thrust on-axis by commanding the seal panel actuator to deflect one or more of the engaged nozzle seal panels to respective positions between stowed and fully deployed.

10. An apparatus as defined in claim 6 in which the controller is configured to direct engine thrust off-axis by commanding the seal panel actuator to deflect one or more of the engaged nozzle seal panels to their respective fully deployed positions.

11. An apparatus as defined in claim 6 in which the controller is configured to direct engine thrust off-axis by commanding the seal panel actuator to deflect one or more of the engaged nozzle seal panels to respective positions between stowed and fully deployed.

12. A method for reducing jet noise generated by an exhaust plume emanating from a variable geometry nozzle of a gas turbine engine, where the variable geometry nozzle comprises a plurality of nozzle seal panels supported in a circumferentially distributed array in respective sealing positions adjacent a plurality of nozzle flap panels supported for alternate collective splaying and gathering motions between a narrow position defining a minimum nozzle exit plane cross-sectional area and a wide position defining a maximum nozzle exit plane cross-sectional area, the method comprising the step of increasing exhaust stream mixing with ambient air by deflecting at least one nozzle seal panel of the plurality of nozzle seal panels radially inward toward a fully-deployed position.

13. A method as defined in claim 12 in which the step of increasing exhaust stream mixing with ambient air includes deflecting at least two diametrically opposed nozzle seal panels of an even-numbered seal panel array radially inward into respective fully-deployed positions.

14. A method as defined in claim 12 in which the step of increasing exhaust stream mixing with ambient air includes deflecting every other one of the nozzle seal panels of an even-numbered seal panel array radially inward into respective fully-deployed positions.

15. A method as defined in claim 12 in which the step of increasing exhaust stream mixing with ambient air includes deflecting selected nozzle seal panels of an odd-numbered seal panel array to respective positions between stowed and fully deployed such that axially-directed thrust is maintained.

16. A method for vectoring thrust developed by a gas turbine engine where the engine includes a variable geometry nozzle comprising a plurality of nozzle seal panels supported in a circumferentially distributed array in respective sealing positions adjacent a plurality of nozzle flap panels supported for alternate collective splaying and gathering motions between a narrow position defining a minimum nozzle exit plane cross-sectional area and a wide position defining a maximum nozzle exit plane cross-sectional area, the method comprising the step of directing off-axis an exhaust plume emanating from the nozzle by deflecting selected nozzle seal panels of the plurality of nozzle seal panels radially inward from respective stowed positions toward respective fully deployed positions.

17. A method as defined in claim 16 in which the deflecting step includes directing engine thrust off-axis by deflecting the selected nozzle seal panels to their respective fully deployed positions.

18. A method as defined in claim 16 in which the deflecting step includes directing engine thrust off-axis by deflecting the selected nozzle seal panels to respective positions between stowed and fully deployed.

19. A computer program product stored on a computer-readable storage medium and including instructions executable by one or more computer processors of an engine control system to cause the engine control system to implement steps of a method according to any one of claims 12 through 18.

20. A computer-controlled system comprising:

at least one input device configured to receive data;

at least one output device configured to present data;

a memory storing program instructions and data;
a processor coupled to the input and output device(s) and memory and configured to cause the computer-controlled system to perform a method according to any one of claims 12 through 18 according to the program instructions.

\* \* \* \* \*